US011082473B1

(12) United States Patent
Yuen et al.

(10) Patent No.: US 11,082,473 B1
(45) Date of Patent: Aug. 3, 2021

(54) METHOD FOR COMPLEXITY REDUCTION IN VIDEO CODING BY CODING PARAMETERS REUSE

(71) Applicant: TFI Digital Media Limited, Hong Kong (HK)

(72) Inventors: Yiu Fai Yuen, Hong Kong (HK); Chi Keung Fong, Hong Kong (HK); Wing Chuen Cheng, Hong Kong (HK); Ho Ting Lee, Hong Kong (HK); Hon Wah Wong, Hong Kong (HK)

(73) Assignee: TFI Digital Media Limited, Hong Kong (HK)

( * ) Notice: Subject to any disclaimer, the term of this patent is extended or adjusted under 35 U.S.C. 154(b) by 0 days.

(21) Appl. No.: 16/819,167

(22) Filed: Mar. 15, 2020

(51) Int. Cl.
*H04L 29/06* (2006.01)
*H04N 19/134* (2014.01)

(52) U.S. Cl.
CPC ......... *H04L 65/607* (2013.01); *H04N 19/134* (2014.11)

(58) Field of Classification Search
CPC .......................... H04L 65/607; H04N 19/134
USPC .................................................... 375/240.02
See application file for complete search history.

(56) References Cited

U.S. PATENT DOCUMENTS

| | | | | |
|---|---|---|---|---|
| 2010/0046612 A1* | 2/2010 | Sun | ...................... | H04N 19/187 375/240.02 |
| 2014/0133547 A1* | 5/2014 | Tanaka | .................... | H04N 19/61 375/240.02 |
| 2015/0319452 A1* | 11/2015 | Lewis | .................. | H04N 19/136 375/240.12 |
| 2015/0350661 A1* | 12/2015 | Yin | ........................ | H04N 19/59 375/240.02 |
| 2018/0278934 A1* | 9/2018 | Andersson | ........... | H04N 19/186 |
| 2019/0052908 A1* | 2/2019 | Mertens | .................... | G09G 5/10 |
| 2019/0130542 A1* | 5/2019 | Tichelaar | ................ | G06T 5/007 |
| 2019/0320002 A1* | 10/2019 | Qin | ........................ | H04L 65/605 |
| 2020/0029078 A1* | 1/2020 | Pu | ........................ | H04N 19/176 |

* cited by examiner

*Primary Examiner* — Marnie A Matt
(74) *Attorney, Agent, or Firm* — Idea Intellectual Limited; Margaret A. Burke; Sam T. Yip

(57) ABSTRACT

A method for video coding with coding parameter reuse is provided as follows. A first video encoding process is executed with respect to a first video source for generating a first video stream by a first video encoder. First coding parameters are exported during the first video encoding process by the first video encoder. The first coding parameters are processed to generate second coding parameters by a parameter processor. A second video encoding process is executed with respect to a second video source for generating a second video stream by a second video encoder. The first and second video sources have different dynamic ranges from each other, and the second coding parameters are introduced into the second video encoding process.

12 Claims, 2 Drawing Sheets

282 Partitioning

203 Intra/Inter Prediction Selection

204 Intra Prediction Directions

205 Motion Vectors in Inter Prediction

METHOD FOR COMPLEXITY REDUCTION IN VIDEO CODING BY CODING PARAMETERS REUSE

FIELD OF THE INVENTION

The present invention generally relates to the field of video coding of standard dynamic range-high dynamic range (SDR-HDR) pair. More specifically, the present invention relates to complexity reduction in video coding of SDR-HDR pair by coding parameter reuse.

BACKGROUND OF THE INVENTION

Brightness is a property of visual perception taken to state or define optical intensity entering human eyes. Since human perception is not linearly related to optical intensity, characterizing brightness has become a challenging task in the video technology. In this regard, standard dynamic range (SDR) is employed for traditional video broadcasting signal. SDR videos follow recommendations like Rec. 601 or Rec. 709. A SDR signal video has a bit depth of 8-bit per sample. Video coding of SDR has been widely used for decades.

In recently years, high dynamic range (HDR) technology will likely have a more profound impact on human viewing experience than an increase in video resolution. Accordingly, HDR videos are becoming popular. A HDR video signal has a bit depth of 10-bit or more per sample and has a dynamic range greater than that of SDR. Accordingly, HDR videos are capable to display brighter whites and deeper blacks, such that HDR videos can provide better perceptual quality over SDR videos. Nowadays, the development of the HDR technology open up broad possibilities in civil and industrial applications, and thus more and more new devices, such as mobile devices and smart TVs, support HDR videos.

However, HDR videos are not well-compatible to old devices (i.e. electronic device in last-generation). That is, even HDR videos are playable on these devices, the colors are faded and washed out. Playing HDR videos on these old devices may give a bad experience to the audiences. To resolve this problem, as a result, both HDR and SDR signals must be prepared and delivered to the audiences according to the capabilities of their devices. For such purpose, to acquire both HDR and SDR signal, there are two common methods. The first is trimming down HDR signal into SDR while the second is up-scaling SDR signal to HDR. After source acquisition, the two video signals are compressed before delivery. To achieve it, video compression executed as a computation intensive process has to double the demand for computation complexity since both SDR and HDR signals must be compressed. Therefore, there is a need in the art for a new approach for reducing computation complexity in video coding of SDR-HDR pair.

SUMMARY OF THE INVENTION

In accordance with one aspect of the present invention, a method for video coding with coding parameter reuse is provided as follows. A first video encoding process is executed with respect to a first video source for generating a first video stream by a first video encoder. First coding parameters are exported during the first video encoding process by the first video encoder. The first coding parameters are processed to generate second coding parameters by a parameter processor. A second video encoding process is executed with respect to a second video source for generating a second video stream by a second video encoder. The first and second video sources have different dynamic ranges from each other, and the second coding parameters are introduced into the second video encoding process.

In some embodiments, the first and second video sources are a pair of a standard dynamic range (SDR) video source and a high dynamic range (HDR) video source, which have the same video content and the same resolution.

In some embodiments, the parameter processor is a parameter refiner, and the method further includes executing a refinement process to refine the first coding parameters into the second coding parameters by the parameter refiner.

In some embodiments, the refinement process is executed to handle dynamic range change and behavior difference between SDR and HDR video sources.

In some embodiments, the refinement process includes a mapping process constructed by a statistical model, a machine learning model, or combinations thereof.

In some embodiments, the method further includes playing at least one of the first and second video streams by a displayer or storing at least one of the first and second video streams in a disk.

By using the video coding method above, the first coding parameters transmitted to the parameter refiner can be processed to refine into the second coding parameters, and the second video encoder can use the second coding parameters to encode the second video source into the second video stream. Because the complexity of running the refinement process of the parameter refiner is much simpler than that of running the second video encoder individually, a large amount of computation for the second video encoding process can be saved. Briefly, the complexity for the second video encoding process can be reduced by reusing the first coding parameters.

BRIEF DESCRIPTION OF THE DRAWINGS

Embodiments of the invention are described in more detail hereinafter with reference to the drawings, in which.

DETAILED DESCRIPTION

In the following description, methods and apparatuses for reducing computation complexity in video coding of standard dynamic range (SDR) and high dynamic range (HDR) compression, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention provides the methods and apparatuses for video coding, which can be used for reducing computation complexity in compression of SDR and HDR video signals. In accordance with various embodiments of the present invention, provided is a method that processes SDR and HDR video signals by reusing coding parameters during video compression. In various embodiments, the provided method may be implemented in a video coding system.

Figure 1:
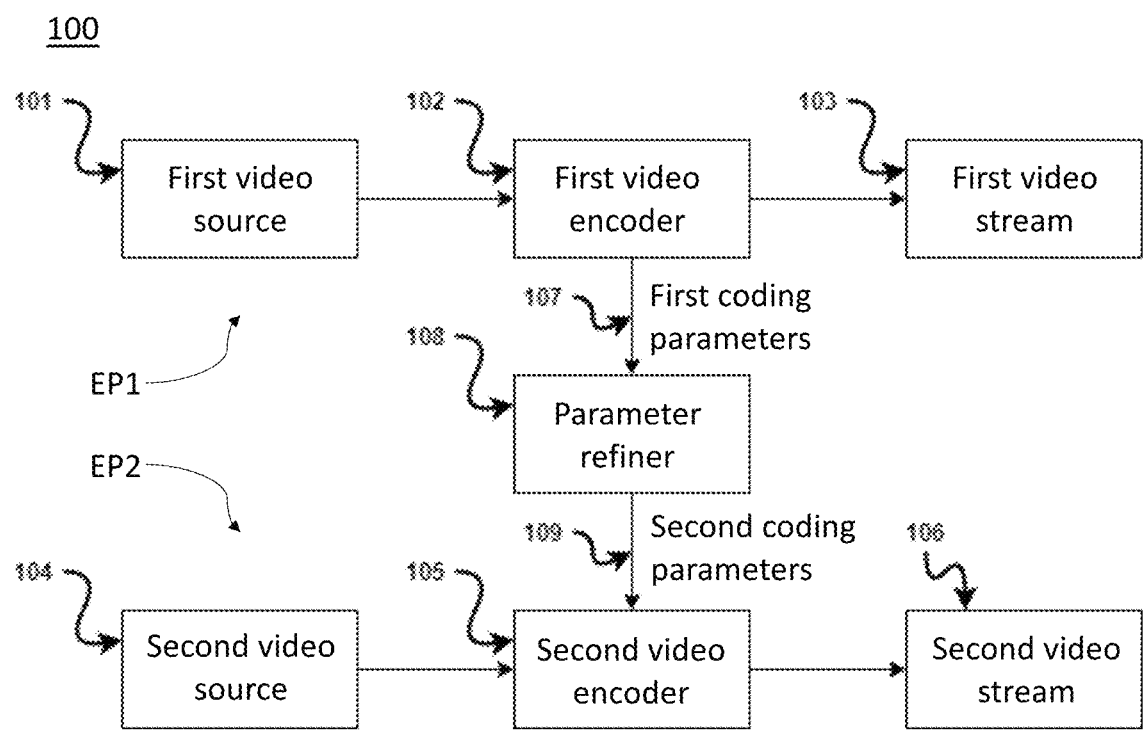
FIG. 1 shows a workflow of video coding in compression of two video signals according to some embodiments of the present invention.

FIG. 1 shows a workflow of video coding in compression of two video signals according to some embodiments of the present invention. A video coding system 100 has a first video encoder 102, a second video encoder 105, and a parameter refiner 108 electrically connected between the first video encoder 102 and the second video encoder 105. The first video encoder 102 and the second video encoder 105 are configured to encode a first video source 101 and a second video source 104, respectively.

The first video source 101 and the second video source 104 have the same resolution and the same video content but different bit depth per sample (i.e. different dynamic ranges). In an embodiments, the first and second video sources 101 and 104 are a pair of a SDR video source and a HDR video source (i.e. "the first video source 101 is a SDR video source and the second video source 104 is a HDR video source" or "the first video source 101 is a HDR video source and the second video source 104 is a SDR video source").

The first video encoder 102 can execute a first video encoding process EP1 with respect to the first video source 101, so as to generate a compressed first video stream 103. Similarly, the second video encoder 105 can execute a second video encoding process EP2 with respect to the second video source 104, so as to generate a compressed second video stream 106. In some embodiments, the first and second video encoding processes EP1 and EP2 are executed such that the first and second video streams 103 and 106 are encoded under the same video coding standard.

The parameter refiner 108 is configured to connect the first and second video encoding processes EP1 and EP2, so as to reduce the complexity of the second video encoding process EP2. The parameter refiner 108 can act as a parameter processor to introduce at least one coding parameter from the first video encoding process EP1 into the second video encoding process EP2, thereby achieving the connection of the first and second video encoding processes EP1 and EP2.

Figure 2A:
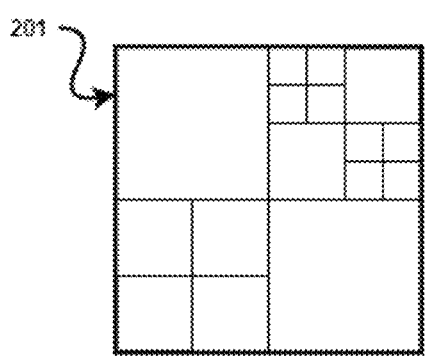
FIG. 2A shows a way to divide a coding unit into smaller partitions according to some embodiments of the present invention.

Regarding the terms "coding parameter", the definition thereof is provided as follows. During a video encoding process, each video frame is divided into a number of units of regular size. In response to different video coding standard, these units may have different names, such as macroblock, coding tree unit (CTU), or others. Referring to FIG. 2A, in the present disclosure, a coding unit 201 is employed to serve as a basic processing unit in a video encoding process, which can conceptually corresponds to macroblock units or CTUs that are used in several video standards.

Figure 2B:
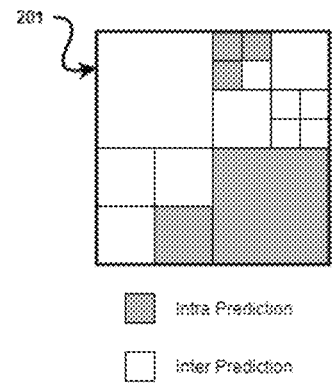
FIG. 2B shows a way to predict content of each partition by intra/inter-prediction selection according to some embodiments of the present invention.
Figure 2C:
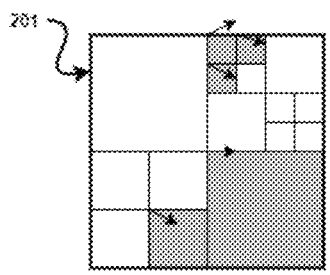
FIG. 2C shows a way to predict content of each partition by modes or directions of intra-prediction according to some embodiments of the present invention.
Figure 2D:
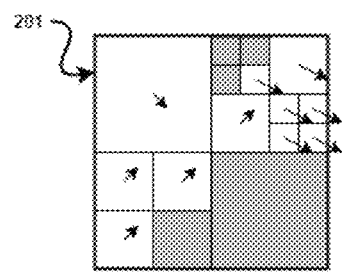
FIG. 2D shows a way to predict content of each partition by motion vectors (MV) of inter-prediction according to some embodiments of the present invention.

Each coding unit 201 can divided into smaller partitions and the way of partitioning is signaled in the video encoding process, in which such signals are referred to as flags of partitioning 202. The content of each partition can be predicted by using a prediction approach in a corresponding coding standard, such as intra/inter-prediction selection 203, the modes or directions of intra-prediction 204, or motion vectors (MV) of inter-prediction 205, as shown in FIGS. 2B, 2C, and 2D, respectively. When the above means are applied alone or collectively, there would be a set of parameters to be signaled in the video encoding process according to the corresponding coding standard.

In the present disclosure, these parameters are named as "coding parameters". In each frame, each coding unit 201 has its own set of coding parameters, which can be computed for obtaining the best rate-distortion performance. Computation for obtaining the best rate-distortion performance is tedious and intensive. Conventionally, computational load is doubled when both SDR and HDR video signals are encoded at the same time, such that several bottlenecks are present in computation of traditional video encoding.

Referring to FIG. 1 again, connecting the first and second video encoding processes EP1 and EP2 can resolve the above problem, because such way reduces the complexity in video coding. The reason is that the coding parameters at the collocated coding units 201 between SDR and HDR video signals are highly correlated. For example, at the mid-band luminance, SDR and HDR signals have similar responses and hence the coding parameters for SDR and HDR video signals are similar. At dark and bright regions, SDR and HDR signals have different responses and hence the coding parameters are different. Even the responses are different, SDR and HDR signals have a predictable relationship in these regions. A mapping can be found for converting coding parameters between SDR and HDR signals. Accordingly, the computation of the coding parameters in second video source 104 can be reduced by reusing coding parameters deployed in the first video source 101.

Specifically, in the workflow of FIG. 1, the first video encoding process EP1 is executed by the first video encoder 102 such that the first video encoder 102 can generate the compressed first video stream 103 and export first coding parameters 107. In some embodiments, the first coding parameters 107 refer to flags of partitioning a coding unit, modes of prediction, inter/intra-prediction selection, or motion vectors during the first video encoding process EP1.

The first coding parameters 107 can be transmitted to the parameter refiner 108. Since video signals in different dynamic ranges (e.g. SDR and HDR video signals) are highly correlated, the parameter refiner 108 can be configured to refine the first coding parameters 107 into second coding parameters 109, which are to be employed in the second video encoding process EP2, according to the nature difference between the first source 101 and the Second source 104.

In this regard, the parameter refiner 108 can adapt the difference between the first coding parameters 107 and the second coding parameters 109 by executing a refinement process. In some embodiments, the refinement process is a coding unit based mapping process which is constructed by a statistical model, a machine learning model, or combinations thereof. For example, in order to achieve the refinement process, the parameter refiner 108 may include at least one neural network therein. During the training, lots of coding parameter features are fed through neural networks to serve as input data, and correct output for the given input data is specified, so as to achieve machine learning. In some embodiments, a machine learning algorithm can take these coding parameter features to produce a program for outputting data. After the training, the parameter refiner 108 can recognize input coding parameters and predict corresponding output coding parameters. Accordingly, the parameter refiner 108 can execute a refinement process to handle dynamic range change and behavior difference between SDR and HDR video sources, such that. Due to high correlation of video signals in different dynamic ranges, the refinement process achieved by the mapping process can work well for handling the coding parameters.

After the exportation of the first coding parameters 107, the first coding parameters 107 transmitted to the parameter refiner 108 can be processed to refine into the second coding parameters 109, called the refined coding parameters also, by running the refinement process by the parameter refiner 108. In some embodiments, the first coding parameters 107 are optionally refined into the second coding parameters 109, thereby improving the Rate-Distortion performance of the second video stream 106. Then, the second video encoder 105 can use the second coding parameters 109 to encode the second video source 104 into the second video stream 106. Because the complexity of running the refinement process by the parameter refiner 108 is much simpler than that of running the second video encoder 105 individually (i.e. generating the second video stream 106 without connecting the first and second video encoding processes EP1 and EP2), a large amount of computation for the second video encoding process EP2 can be saved. That is, the complexity for the second video encoding process EP2 can be reduced by reusing the first Coding Parameters 107. Thereafter, the first and second video streams 103 and 106 in response to video signals in different dynamic ranges can be provide to an electronic device having a displayer for playing. The present invention is not limited by playing the video streams. In other embodiments, the first and second video streams 103 and 106 can be stored in a physical component, such as a disk in a computer, a server, a mobile, or the likes.

The electronic embodiments disclosed herein, particularly the described processing servers, may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for video coding with coding parameter reuse, comprising:
    executing a first video encoding process with respect to a first video source for generating a first video stream by a first video encoder;
    exporting first coding parameters during the first video encoding process by the first video encoder;
    processing the first coding parameters to generate second coding parameters by a parameter processor; and
    executing a second video encoding process with respect to a second video source for generating a second video stream by a second video encoder, wherein the first and second video sources have different dynamic ranges from each other, and the second coding parameters are introduced into the second video encoding process;
    wherein the first and second video sources are a pair of a standard dynamic range (SDR) video source and a high dynamic range (HDR) video source, which have the same video content and the same resolution but different dynamic ranges.

2. The method of claim 1,
    wherein the first coding parameters refer to flags of partitioning a coding unit, modes of prediction, inter/intra-prediction selection, or motion vectors during the first video encoding process;
    wherein the parameter processor is a parameter refiner; and
    wherein the method further comprises:
        executing a refinement process to refine the first coding parameters into the second coding parameters by the parameter refiner for improving a rate-distortion performance of the second video stream.

3. The method of claim 2, wherein the refinement process is executed to handle dynamic range change and behavior difference between SDR and HDR video sources.

4. The method of claim 3, wherein the refinement process comprises:
    generating the second coding parameters similar to the first coding parameters for the SDR video source signals having similar responses as those of the HDR video source signals; and
    generating the second coding parameters different from the first coding parameters for the SDR video source signals having different responses as those of the HDR video source signals.

5. The method of claim 2, wherein the refinement process comprises:
    a mapping process constructed by a statistical model, a machine learning model, or combinations thereof for converting one or more of the first coding parameters to one or more of the second coding parameters or vice versa based on one or more predictable relationships between regions in the SDR and HDR video sources.

6. The method of claim 1, further comprising:
    playing at least one of the first and second video streams by a displayer.

7. The method of claim 1, further comprising:
   storing at least one of the first and second video streams in a disk.

8. A system for video coding with coding parameter reuse, comprising:
   a first video encoder configured to execute a first video encoding process with respect to a first video source for generating a first video stream and to export first coding parameters during the first video encoding process;
   a parameter processor configured to process the first coding parameters to generate second coding parameters; and
   a second video encoder configured to execute a second video encoding process with respect to a second video source for generating a second video stream, wherein the first and second video sources have different dynamic ranges from each other, and the second coding parameters are introduced into the second video encoding process;
   wherein the first and second video sources are a pair of a standard dynamic range (SDR) video source and a high dynamic range (HDR) video source, which have the same video content and the same resolution but different dynamic ranges.

9. The system of claim 8, wherein the first coding parameters refer to flags of partitioning a coding unit, modes of prediction, inter/intra-prediction selection, or motion vectors during the first video encoding process;
   wherein the parameter processor is a parameter refiner, and configured to execute a refinement process to refine the first coding parameters into the second coding parameters by the parameter refiner for improving a rate-distortion performance of the second video stream.

10. The system of claim 9, wherein the refinement process is executed to handle dynamic range change and behavior difference between SDR and HDR video sources.

11. The system of claim 10, wherein the refinement process comprises:
    generating the second coding parameters similar to the first coding parameters for the SDR video source signals having similar responses as those of the HDR video source signals; and
    generating the second coding parameters different from the first coding parameters for the SDR video source signals having different responses as those of the HDR video source signals.

12. The system of claim 9, wherein the refinement process is a coding unit-based mapping process which is constructed by a statistical model, a machine learning model, or combinations thereof for converting one or more of the first coding parameters to one or more of the second coding parameters or vice versa based on one or more predictable relationships between regions in the SDR and HDR video sources.

* * * * *